INVENTOR.
ERNEST R. De SANTIS
BY
ATTORNEY

Dec. 4, 1956 E. R. DE SANTIS 2,773,249
REMINDER TO DISCONNECT VEHICLE LIGHTS
OR TO SET THE HAND BRAKE
Filed Jan. 31, 1955 2 Sheets-Sheet 2

*INVENTOR.*
ERNEST R. De SANTIS
BY
ATTORNEY

2,773,249

REMINDER TO DISCONNECT VEHICLE LIGHTS OR TO SET THE HAND BRAKE

Ernest R. De Santis, Glenolden, Pa.

Application January 31, 1955, Serial No. 485,110

1 Claim. (Cl. 340—52)

My invention relates to a signalling system for automobiles and it relates more particularly to a signalling system for indicating to the driver of a vehicle which is not in use that the hand or parking brake has not been applied.

When a motorist stops his engine, he tends to rely on the gears to hold the car or he may feel that the grade is such that the car will not roll, or he may be plain forgetful so that the car is parked with the hand brake in its off position. Modern cars almost universally employ the free-wheeling principle and except for a few makes which have a so called parking gear, modern cars can not rely on gears to prevent them rolling away. An unattended car with its hand brake off can be dangerous.

Also, motorists quite often leave a parked car with its lights on and this runs down the battery.

It is therefore the object of my invention to provide a sigalling system which will give a visual or an audible signal whenever the engine of the car is turned off with the hand brake off or with the lights on.

The full nature of the invention will be understood from the following specification and the accompanying drawings in which:

Fig. 2 is similar to Fig. 1 but showing a signalling system which activates the buzzer when the engine is turned off with either the hand brake in its off position or when the lights of the car are turned on.

Figure 1:
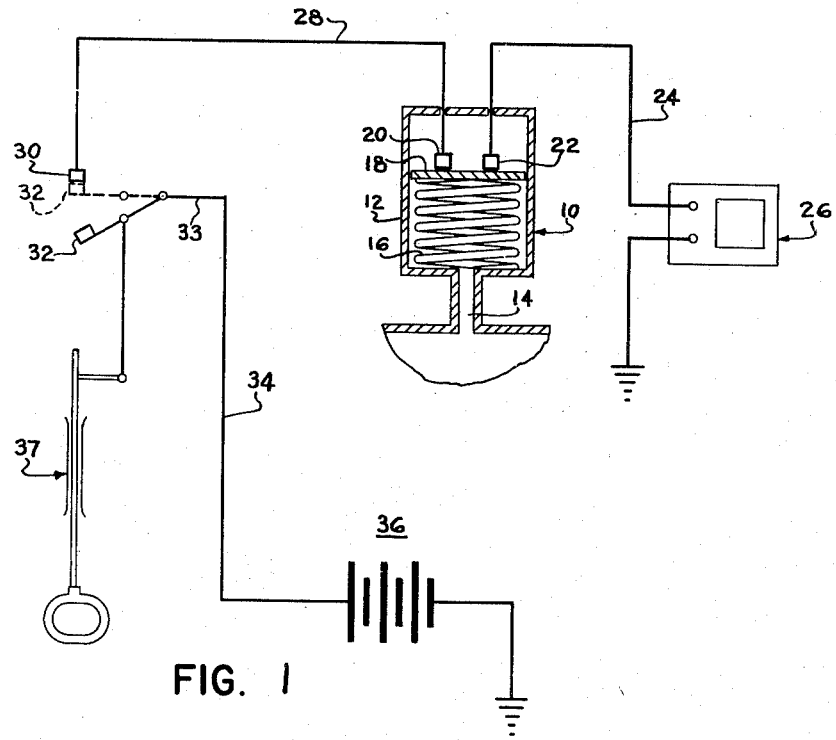
Fig. 1 is a diagrammatic view of a signalling system which will activate a buzzer if the engine of the car is turned off with the hand brake in its off position.

Referring to Fig. 1, 10 designates a vacuum switch which includes a body 12 connected to the suction side of the manifold of the car by means of a pipe 14 whereby the interior of the casing is subjected to reduced pressure as long as the engine of the car is running. In the casing 12 is a spring 16 which normally biases a conducting plate 18 into engagement with terminals 20 and 22. It should be noted that the spring 16 is rather light so that as long as the engine of the car is running, even at idling speed by suction from the manifold, plate 18 will be withdrawn, from engagement with terminals 20 and 22, against the action of spring 16. Terminal 22 is connected, by wire 24 to a conventional light or buzzer 26 and terminal 20 is connected by wire 28 to one terminal 30 of a switch, the other terminal 32 of which is connected by wires 33 and 34 to a battery 36. Terminal 32 is carried, or is movable, by the hand brake 37 of the car and the arrangement is such that when the hand brake is in its off position terminal 32 is moved into engagement with terminal 30 and when the hand brake is applied, or pulled up, terminal 32 is disengaged from terminal 30.

The structure thus far described operates as follows:

When the engine is turned off, spring 16 biases plate 18 into contact with terminals 20 and 22 and current will flow from battery 36 through wires 34 and 33, and terminals 32 and 30, and wire 28, terminal 20 and plate 18 and terminal 22 and wire 24 to energize signal 26. As soon as the brake is pulled up, or applied, terminal 32 is pulled out of engagement with terminal 30 and signal 36 is de-energized.

Figure 2:
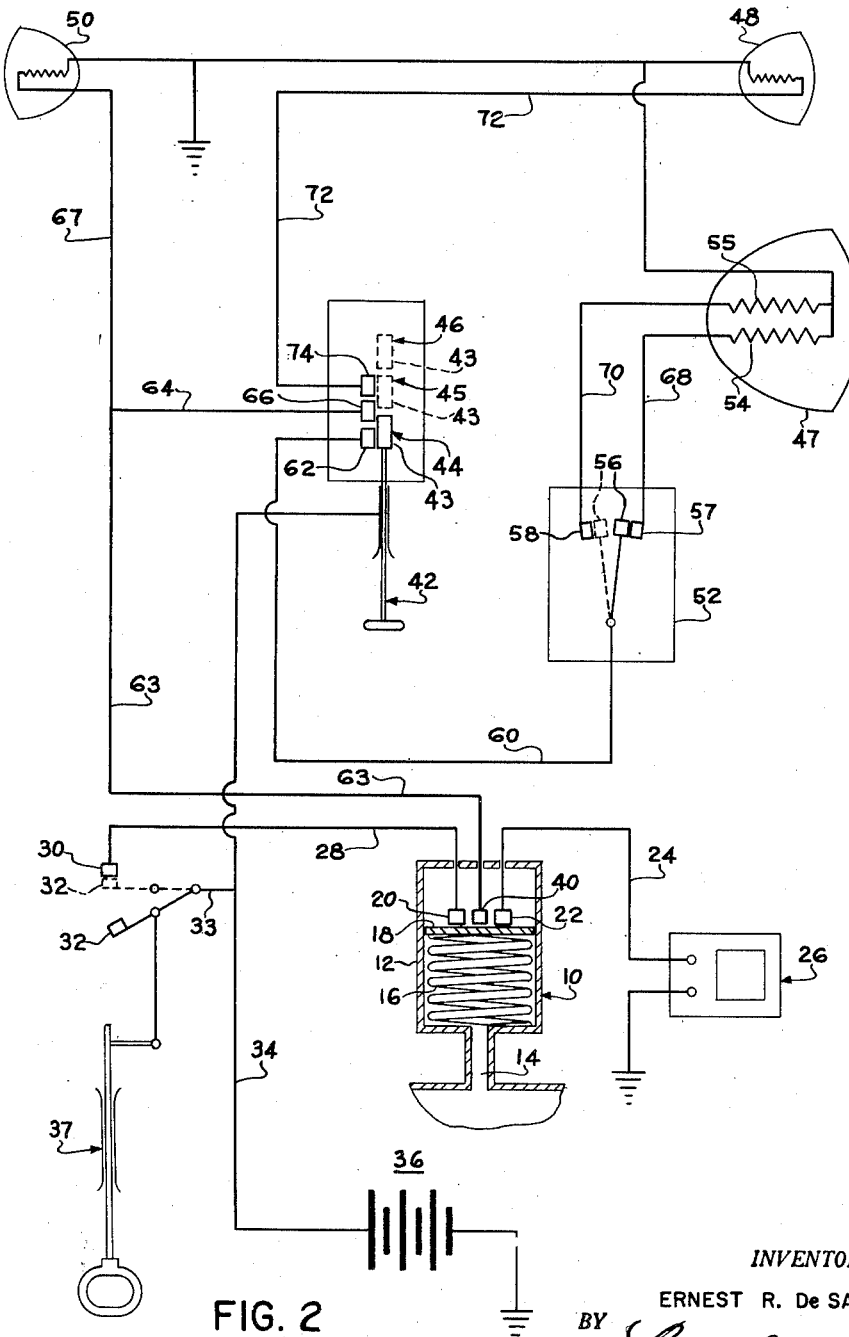

In Fig. 2, I show the arrangement of Fig. 1 and an additional arrangement which will also activate the buzzer whenever the driver turns the engine off without turning the lights off. This arrangement includes a third terminal 40 which is adapted to be engaged by plate 18, when the engine is turned off; a light switch 42 having a terminal 43 and movable to two "on" positions 44 and 45 and to one off position 46; high and low beam headlights 47; a parking light 48, and a tail light 50. A selector switch 52 is also provided for energizing the low beam 54 or the high beam 55. Selector switch 52 includes a terminal 56 which can be selectively engaged with low beam terminal 57 or with high beam terminal 58. Switch terminal 56 is connected by wire 60 to fixed terminal 62 of the light switch and terminal 40 is connected by wires 63 and 64 to fixed terminal 66 of the light switch. Terminal 40 is also connected through wires 63 and 67 to tail light 50. Terminal 57 is connected by wire 68 to low beam filament 54 and terminal 58 is connected by wire 70 to high beam filament 55. Parking light 48 is connected by wire 72 to fixed light switch terminal 74. The operation is as follows:

When light switch 42 is in its off position 46 terminal 43 does not engage any of terminals 62, 66 and 74 and none of the lights is energized and if the hand brake 37 is applied, or if the engine is running, signal 26 will not be energized. If switch 42 is moved to position 45, terminal 43 will engage terminals 66 and 74 to energize tail light 50 through wires 64 and 67 and to energize parking light 48 through wire 72. If switch 42 is moved to position 44, switch 52 will be energized and will energize low beam filament 54 or high beam filament 55 depending on the position of terminal 56. If, in either of these positions, the engine is turned off, buzzer 26 will be energized through wire 24, terminal 22, plate 18, terminal 40, wires 63 and 64 and terminal 66. It will be noted that signal 26 will be actuated even though the hand brake is on and terminals 30 and 32 are disengaged. Of course, if the engine is running, signal 26 can not be energized, regardless of the position of the hand brake 37 or of the light switch 42.

In proper driving, the engine should be started with the hand brake 37 on and with the light switch 42 off and under these conditions signal 26 will not be energized.

Since the addition of the arrangement of Fig. 2 does not make any change in the structure of Fig. 1 necessary, the arrangement of Fig. 1, as combined with that of Fig. 2 need not be described all over again.

What I claim is:

A device for indicating to the operator of a motor vehicle having headlights and a parking brake, that the parking brake is in its off position, or that the headlights are energized even though the motor of said vehicle is turned off, said device including a casing, a conducting plate movably mounted in said casing, means normally biasing said plate to a first position within said casing, means connecting said casing to the suction manifold of the motor whereby said plate is moved to a second position within said casing when the motor is operating, a first, a second and a third terminal, all of said terminals being fixed in a common plane within said casing and arranged for simultaneous contact with said plate when said plate is in said first position, an electrically operated signal, a first conductor connecting said first terminal to said signal, a first circuit for energizing said headlights, a first switch included in said first circuit, a second conductor connecting said second terminal to said first circuit through said first switch, a second circuit including a second switch, means connecting said second circuit to said parking brake in such a manner that said second switch is opened when the parking brake is in its on position and closed when said brake is in its off position, a conductor connecting said third terminal to one side of said second switch, and means connecting either of said circuits to the electric system of the vehicle subject to the control of either of said switches.

References Cited in the file of this patent

UNITED STATES PATENTS

| | | |
|---|---|---|
| 2,349,740 | McCollum | May 23, 1944 |
| 2,613,258 | Azano | Oct. 7, 1952 |
| 2,634,400 | Sweet | Apr. 7, 1953 |
| 2,724,101 | Hallman | Nov. 15, 1955 |

FOREIGN PATENTS

| | | |
|---|---|---|
| 40,231 | Australia | Dec. 9, 1931 |